United States Patent Office 3,490,068
Patented Jan. 13, 1970

3,490,068
1,4-DIOXA - 6,7-(1,2-CARBORANYLENE)-2-(1-CARBORANYL) - 2 - METHYLCYCLOOCTANE AND β-HYDROXY - β - (CARBORAN-1-YL)PROPYL-(1'-HYDROXYMETHYLCARBORAN - 2'-YL)METHYL ETHER
Joseph Green, Dover, and Nathan Mayes, Ironia, N.J., assignors to Thiokol Chemical Corporation, Bristol, Pa., a corporation of Delaware
No Drawing. Filed May 17, 1966, Ser. No. 550,620
Int. Cl. C07f 5/00; C06b 15/00
U.S. Cl. 260—338
3 Claims

ABSTRACT OF THE DISCLOSURE

The novel carborane compounds 1,4-dioxa-6,7-(1,2-carboranylene) - 2 - (1-carboranyl)-2-methylcyclooctane and β-hydroxy-β-(carboran-1-yl)propyl-(1'-hydroxymethylcarboran-2'-yl)methyl ether are prepared by a process comprising contacting 1-(epoxyisopropyl)carborane with 1,2-bis-(hydroxymethyl)carborane in the presence of an inert solvent and an acid catalyst. The compounds are useful as high-energy additives for rocket propellants.

---

This invention relates to new carborane compounds and to a method for preparing the same. More particularly, this invention relates to the preparation of a carborane exocycle and a carborane diol.

Both of the carborane compounds of this invention contain one carboranyl radical and one carboranylene radical. Thus the compounds contain a high percentage of boron and are useful as high-energy additives for rocket propellants. A further utility of the carborane diol is as a monomer for condensation polymerization to yield polyester, polyurethanes, and polyformals. As will be understood by persons conversant with the nomenclature of carborane compounds, the monovalent carboranyl radical is represented by the formula

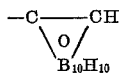

and is formed by the removal of the hydrogen atom attached to one of the carbon atoms of carborane, $C_2B_{10}H_{12}$. The divalent carboranylene radical is represented by the formula

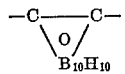

and is formed by the removal of the hydrogen atom from each of the two carbon atoms of carborane. A detailed description of carborane appears in Chemical and Engineering News, volume 41 (Dec. 9, 1963), pages 62–70.

It is accordingly an object of this invention to provide new carborane compounds which are useful as high-energy additives for rocket propellants.

Another object of the invention is to provide a carborane exocycle and a carborane diol each of which contains two carboranylene radicals and thus a high percentage of boron.

Still another object of this invention is to provide a method for preparing 1,4-dioxa-6,7-(1,2-carboranylene)-2-(1'-carboranyl)-2-methylcyclooctane and β-hydroxy-β-(carboran - 1-yl)propyl-(1'-hydroxymethylcarboran-2'-yl) methyl ether.

These and other objects are attained by reacting 1-(epoxyisopropyl)carborane and 1,2-bis-(hydroxymethyl) carborane to yield the above-named carborane exocycle and carborane diol, the reaction being effected in the presence of an inert solvent and an acid catalyst under reflux conditions. The preparation and structure of the reactants and products are illustrated by the following equation:

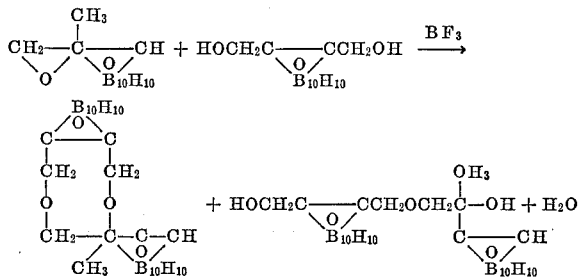

The invention will be more clearly understood by consideration of the following preferred process embodiment thereof.

A 26.0 g. (0.130 mole) portion of 1-(epoxyisopropenyl)carborane, 26.0 g. (0.127 mole) of 1,2-bis(hydroxymethyl)carborane, and 150 ml. of toluene were placed in a reaction flask fitted with a water condenser, a Dean-Stark distilling receiver, a plastic-coated magnetic stirrer, and a gas inlet tube. The mixture was heated with stirring to reflux at ambient pressure and became homogeneous. Boron trifluoride was bubbled into the solution several times during 48 hrs. of refluxing, and 2.0 ml. of water was collected in the Dean-Stark receiver. The reaction mixture was concentrated by evaporating most of the solvent and then dissolved in methanol and precipitated by addition of water. The solid precipitate weighed 19.5 g. (40% yield); a sample twice recrystallized from hexane melted at 249–251° C. Infrared analysis, molecular weight determination, and elemental analysis indicated the compound to be 1,4-dioxa-6,7-(1,2-carboranylene)-2-(1'-carboranyl)-2-methylcyclooctane. The infrared spectrum contained absorptions at 3060 cm.$^{-1}$ for CH of carborane, at 2560 cm.$^{-1}$ for BH of carborane, at 1374 cm.$^{-1}$ for $CCH_3$, at 1127 cm.$^{-1}$ for COC, and at 730 cm.$^{-1}$ for BH deformation of carborane. No absorption for OH was present. The molecular weight obtained cryoscopically in benzene was 378 (calculated 386).

*Analysis.*—Calcd. for $C_9H_{30}O_2B_{20}$: C, 27.96%; H, 7.82%; B, 55.93%. Found: C, 26.77%; H, 7.92%; B, 55.72%.

The methanol-water mother liquor was evaporated to yield a gum from which unreacted 1,2-bis(hydroxymethyl)carborane was extracted with 5% aqueous sodium hydroxide and unreacted 1 - (epoxyisopropenyl)carborane was extracted with petroleum ether. The remaining solid, weight 9.6 g. (19% yield), was identified as β-hydroxy-β-(carboran-1-yl)propyl-(1' - hydroxymethylcarboran-2'-yl)methyl ether. After three recrystallizations from heptane it melted at 196–201° C. The infrared spectrum exhibited absorption bands at 3370 cm.$^{-1}$ for OH stretching and a doublet at 1170 and 1160 cm.$^{-1}$ for tertiary OH deformation. Other bands were at 3080 cm.$^{-1}$ for CH of carborane, at 2940 and 2860 cm.$^{-1}$ for aliphatic CH, at 2560 cm.$^{-1}$ for BH of carborane, at 1116 cm.$^{-1}$ for COC, and at 727 cm.$^{-1}$ for BH deformation of carborane. The molecular weight determined cryoscopically in benzene was 415 (calculated 405). The proton magnetic resonance spectrum, obtained in benzene solution with tetramethylsilane added as an internal reference, exhibited the following singlets (τ): 8.95, $CH_3$; 7.18, $CH_2$; 6.89 tertiary OH; 6.72, $CH_2$; and 6.26, —$CH_{10}H_{10}CH$. The $CH_2OH$ group appeared as an $AB_2$ multiplet with the center of the $CH_2$ doublet at τ 6.56 and the center of the OH triplet at τ 8.01. The first-order coupling constant was 7.9 c.p.s. The error for all values, except the —$CB_{10}H_{10}CH$ shift, is ±0.01 p.p.m. The —$CB_{10}H_{10}CH$ shift error is greater due to its unusually broad resonance.

*Analysis.*—Calcd. for $C_9H_{32}O_3B_{20}$: C, 26.71%; H, 7.97%; B, 53.44%; OH, 8.40%. Found: C, 26.95%; H, 8.09%; B, 51.34%; OH, 8.92%.

The reaction is most conveniently carried out in an inert solvent. However, solvents other than toluene can be employed, for example, benzene and heptane, and under certain conditions a solvent may not be necessary. Preferably any inert solvents which are employed should form azeotropes with water. The temperature at which the reaction is effected can vary between 50° to 200° C. and preferably should be from about 90° to 130° C. Ambient or near ambient pressures have been found suitable for the reaction.

The reaction is preferably catalyzed by $BF_3$ or other Lewis acid catalysts, but proton acids such as sulfuric acid can also be employed for this purpose.

It will thus be recognized that the invention is not limited to the specific reaction conditions employed in the above-described preferred embodiment. Hence, the scope of the invention is to be understood as limited only by the terms of the appended claims.

What is claimed is:
1. A compound having the formula:

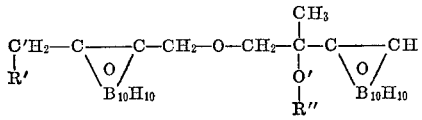

wherein taken singly R' is the hydroxy radical and R" is hydrogen, and taken together R' and R" are a single bond between C' and O'.

2. 1,4-dioxa-6,7-(1,2-carboranylene)-2-(1' - carboranyl)-2-methylcyclooctane.

3. β-hydroxy-β-(carboran-1-yl)propyl - (1' - hydroxymethylcarboran-2'-yl)methyl ether.

References Cited

UNITED STATES PATENTS
3,153,056  10/1964  Ager et al.

OTHER REFERENCES
Epoxides and Their Derivatives, by Malinovskii, 1965, pp. 122–24.

HENRY R. JILES, Primary Examiner

S. WINTERS, Assistant Examiner

U.S. Cl. X.R.

149—22; 260—67, 75, 77.5, 606.5